United States Patent [19]

Amano et al.

[11] Patent Number: 4,665,883

[45] Date of Patent: May 19, 1987

[54] AIR FUEL RATIO CONTROL SYSTEM FOR AN INTERNAL COMBUSTION ENGINE WITH IMPROVED OPERATIONS FOR MAINTAINING THE ENGINE OUTPUT POWER

[75] Inventors: Katsuhisa Amano, Fujimi; Yasuhisa Arai; Noritaka Kushida, both of Tokyo; Masahiko Asakura, Tokorozawa, all of Japan

[73] Assignee: Honda Giken Kogyo Kabushiki Kaisha, Tokyo, Japan

[21] Appl. No.: 779,556

[22] Filed: Sep. 24, 1985

[30] Foreign Application Priority Data

Sep. 26, 1984 [JP]  Japan .................................. 59-201177

[51] Int. Cl.[4] ............................................. F02M 25/06
[52] U.S. Cl. ..................................... 123/571; 123/585
[58] Field of Search ............... 123/478, 492, 493, 568, 123/569, 571, 585, 587

[56] References Cited

U.S. PATENT DOCUMENTS

| | | | |
|---|---|---|---|
| 4,349,005 | 9/1982 | Gotoh et al. | 123/571 |
| 4,386,597 | 6/1983 | Ootaka et al. | 123/571 X |
| 4,387,694 | 6/1983 | Yoshiba et al. | 123/571 |
| 4,429,676 | 2/1984 | Gotoh et al. | 123/571 |
| 4,454,854 | 6/1984 | Gotoh et al. | 123/571 |

*Primary Examiner*—Willis R. Wolfe, Jr.
*Attorney, Agent, or Firm*—Pollock, Vande Sande and Priddy

[57] ABSTRACT

An air/fuel ratio control system for an internal combustion engine provides a mixture leaner than a predetermined reference value when a detected engine load is in a light load range. In order to produce a required engine power during a transitional period, the system detects the speed of variation of an operating parameter used for the calculation of air/fuel ratio and controls the air/fuel ratio toward the reference level even though the magnitude of the detected engine load is in the light load range. Preferably, an EGR rate is also made smaller upon occurrence of a rapid change of the operating parameter so as to prevent the power down of the engine during the transitional period.

4 Claims, 2 Drawing Figures

AIR FUEL RATIO CONTROL SYSTEM FOR AN INTERNAL COMBUSTION ENGINE WITH IMPROVED OPERATIONS FOR MAINTAINING THE ENGINE OUTPUT POWER

BACKGROUND OF THE INVENTION

1. Field of the Invention

The present invention relates to an air/fuel ratio control system for an internal combustion engine, and more specifically to an air/fuel ratio control system designed for purifying exhaust gas on the basis of various operating parameters.

2. Description of Background Information

As an example of the system of this type for an internal combustion engine mounted on a vehicle, a technique is disclosed in Japanese Patent Publication No. 56-7508. In this technique, magnitude of the engine load is judged on the basis of detected results of various engine parameters such as the gear position, the vacuum level within the intake manifold, the vehicle speed, and the rotational speed of the engine. When the judged magnitude of engine load is within a predetermined load range, the system shifts the air/fuel ratio of the mixture to the lean side.

However, in this type of conventional air/fuel ratio control system, there has been a drawback that the engine output power becomes lower than a required value, causing the deterioration of the driveability of the vehicle under such a condition that the operating parameters change rapidly within a range for providing a lean air/fuel ratio due to a transition of the engine operation. This is because the air/fuel ratio is always made lean by this system when the magnitude of the engine load is within the range for providing the lean mixture without regard to state of the engine operation, i.e. whether it is under the transitional state mentioned above or under a stable state.

OBJECT AND SUMMARY OF THE INVENTION

An object of the present invention is therefore to provide an air/fuel ratio control system for an internal combustion engine in which deterioration of driveability is prevented even though an engine parameter such as the vehicle speed is changed rapidly within the range for providing the lean mixture.

According to the present invention, the air/fuel ratio of the engine is controlled using a reference value as a target when the speed of a change of the detected value of an engine parameter becomes larger than a predetermined value even though the detected magnitude of the engine load is within the range for providing an air/fuel ratio leaner than a predetermined reference air/fuel ratio.

According to another aspect of the present invention, the air/fuel ratio is controlled using a reference value as a target and the EGR control is performed at a predetermined EGR rate when the speed of variation of the detected value of the operating parameter exceeds the predetermined value, even though the magnitude of the engine load is within a range for providing a mixture leaner than a reference value and for performing the EGR control at an EGR rate reduced to be smaller than a predetermined EGR rate.

DETAILED DESCRIPTION OF PREFERRED EMBODIMENTS

Figure 1:
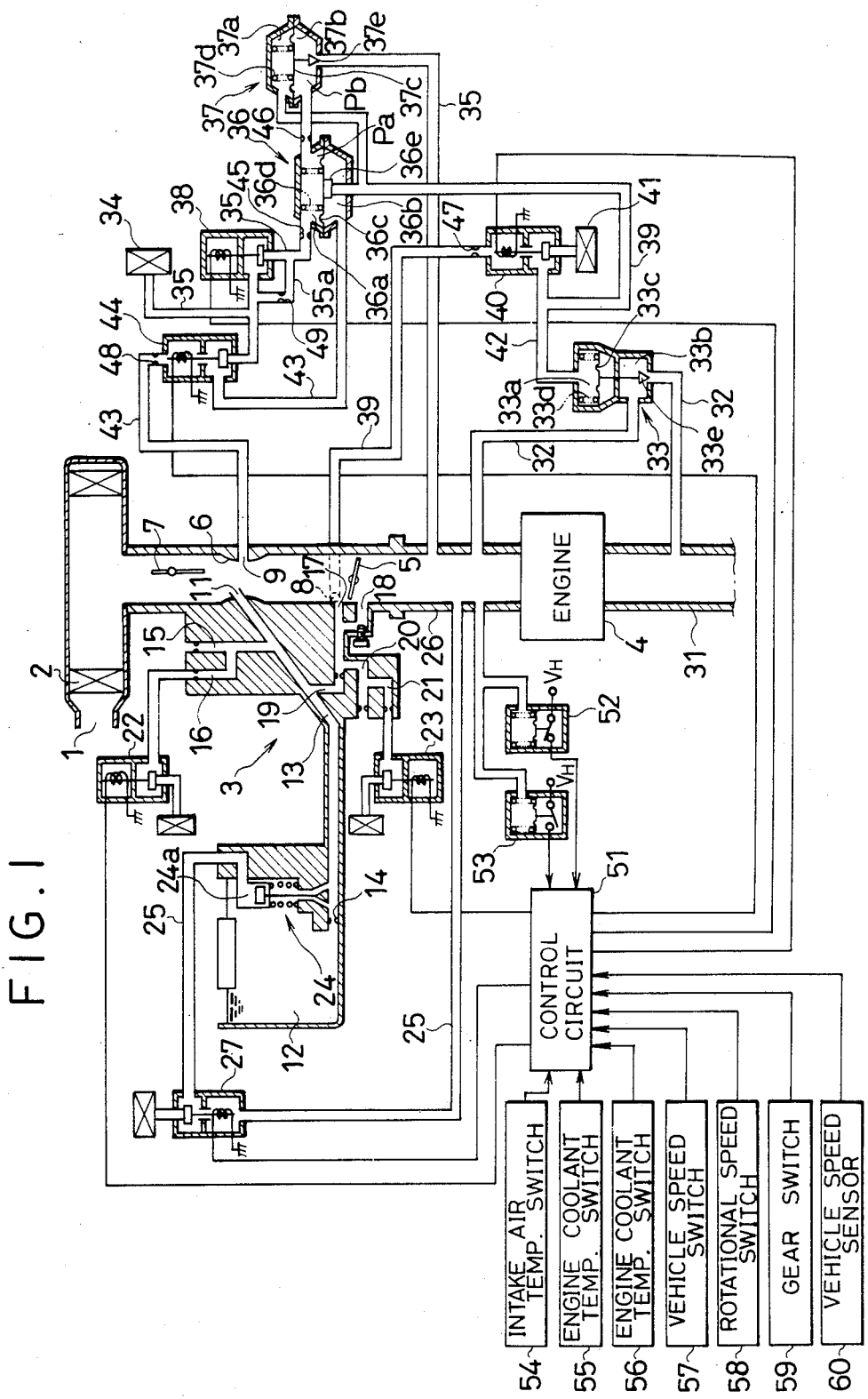
FIG. 1 is a schematic diagram showing an embodiment of the air/fuel ratio control system according to the present invention.

FIG. 1 shows an embodiment of air/fuel ratio control system according to the present invention.

In FIG. 1, air taken at an air inlet port 1 is supplied to an internal combustion engine 4 via an air cleaner 2, and a carburetor 3. The carburetor 3 is provided with a throttle valve 5 and a venturi 6 is formed upstream of the throttle valve 5. A choke valve 7 is provided upstream of the venturi 6. In a throttle body, a vacuum detection hole 8 is provided near the throttle valve, in such a manner that the vacuum detection hole is on the upstream side of the throttle valve 5 when the throttle valve 5 is closed and on the downsteam side of the throttle valve 5 when the throttle valve 5 is open. A vacuum detection hole 9 is also provided in the venturi 6.

In the venturi 6, an opening of a main nozzle 11 of a main fuel supply system is located, and nozzle 11 is connected to the float chamber 12 through a main fuel passage 13. A main air bleed 15 communicates with the main fuel passage 13 on the downstream side of a main jet 14 which is located near the float chamber 12. An auxiliary air bleed 16 is also provided and communicates with the main air bleed 15.

In an inner wall of the throttle bore near the throttle valve 5, a slow port 17 and an idle port 18 of the slow fuel supply system are located, which slow port 17 and the idle port 18 communicate with the main fuel passage 13 via a slow fuel passage 19. A slow air bleed 20 and its auxiliary air bleed 21 communicate with the slow fuel supply passage 19. The auxiliary air bleeds 16 and 21 are respectively provided with solenoid valves 22 and 23 which respectively make communication through the auxiliary air bleeds 16 and 21 when actuated, and close the communication when not actuated.

A power valve 24 is provided in the float chamber 12 so that fuel in the float chamber 12 is supplied through the power valve 24 to the main fuel passage 13, on the downstream side of the main jet 14. The power valve 24 has a pressure chamber 24a and the opening degree of the power valve 24 is controlled by the magnitude of a pressure applied to the pressure chamber 24a. When the pressure in the pressure chamber 24a is equal to atomospheric pressure, the power valve 24 will be fully opened. The power valve 24 starts to close when a vacuum develops in the pressure chamber 24a and the opening degree of the power valve 24 decreases as the magnitude of the vacuum in the pressure chamber 24a increases. The pressure chamber 24a communicates, through a vacuum supply passage 25, with an intake manifold 26 located on the downstream side of the throttle valve 5. The vacuum supply passage 25 is provided with a three way valve 27 which makes the communication through the vacuum supply passage 25 when not actuated. When the three way valve 27 is actuated, the vacuum supply passage 25 is closed at its portion connected to the intake manifold 26 and the vacuum supply passage 25 is opened to the atmosphere at its portion leading to the pressure chamber 24a.

The engine has an exhaust gas recirculation (EGR) passage 32 which provides a communication between the inside of the intake manifold 26 and the inside of an exhaust manifold 31. The EGR passage 32 is provided with an EGR control valve 33 which consists of a vacuum chamber 33a, a valve chamber 33b forming a part of the EGR passage 32, a diaphragm 33c defining the vacuum chamber 33a, a valve spring 33d provided in the vacuum chamber 33a, and a tapered valve element 33e provided in the valve chamber 33b and urged by the valve spring 33d via the diaphragm 33c in a direction to close the EGR passage 32.

A controlled intake air passage 35 leading from an atmospheric air inlet port 34 is connected to the intake manifold 26. A vacuum controlled regulation valve 36 and a vacuum controlled air valve 37 are provided in the controlled intake air passage 35. The regulation valve 36 and the air valve 37 are made up respectively of vacuum chambers 36a, 37a, valve chambers 36b, 37b, diaphragms 36c, 37c, valve springs 36d, 37d, and valve elements 36e, 37e. The vacuum chamber 36a is provided in the controlled intake air passage 35 and the valve chamber 37b is also provided in the controlled intake air passage 35, on the downstream side of the vacuum passage 35. The valve element 37e in the valve chamber 37b is urged by the valve spring 37d via the diaphragm 37c in a direction to close the controlled intake air passage 35. Also, a solenoid valve 38 is provided in the controlled intake air passage 35, on the upstream side of the vacuum chamber 36a. The solenoid valve 38 is adapted to close the controlled intake air passage 35 when not activated and to make the communication through the controlled intake air passage 35 when activated. An auxiliary passage 35a having an orifice 49 is provided so as to bypass the solenoid valve 38. The vacuum chamber 37a of the air valve 37 is communicated to the vacuum detection hole 8 through a vacuum supply passage 39. The vacuum supply passage 39 is provided with a three way valve 40 which makes the communication through the vacuum supply passage 39 when not activated. When activated, the three way valve 40 closes a part of the vacuum supply passage 39 leading to the vacuum detection hole 8 and opens a part of the vacuum supply passage 39 leading to the vacuum chamber 37a, to the atmosphere through an atmospheric air inlet port 41. A portion of the vacuum supply passage 39 leading to the regulation valve 36 and starting from the solenoid valve 40 communicates with the vacuum chamber 33a of the EGR control valve 33. The vacuum chamber 36b communicates with the vacuum detection hole 9 via a vacuum supply passage 43. The vacuum supply passage 43 is also provided with a three way valve 44 which makes the communication through the vacuum supply passage 43 when not actuated. When the three way valve 44 is activated, a part of the vacuum supply passage 43 leading to the vacuum detection hole 9 is closed and at the same time a part of the vacuum supply passage 43 leading to the valve chamber 36b is opened to the atmosphere via atmospheric air inlet port 34. The valve chamber 36b is arranged so that it can communicate with the vacuum supply passage 39. The valve element 36e in the valve chamber 36b is urged by the valve spring 36d via the diaphragm 36c so as to close the communication from the valve chamber 36b to the vacuum supply passage 39. An orifice 45 having a flow area larger than that of the orifice 49 is provided in the controlled intake air passage 35 on the upstream side of the vacuum chamber 36a. The controlled intake air passage 35 is further provided with an orifice 46 on the downstream side of the vacuum chamber 36a. The vacuum supply passage 39 is provided with an orifice 47 at a portion leading to the vacuum detection hole 8 and starting from the solenoid valve 40, and the vacuum supply passage 43 is also provided with an orifice 48.

Each of the solenoid valves 22, 23, 27, 38, 40, and 44 has a solenoid connected to a control circuit 51. The control circuit 51 also receives output signals of various switches and a sensor, namely, vacuum switches 52 and 53, an intake air temperature switch 54, engine coolant temperature switches 55 and 56, a vehicle speed switch 57, an engine rotational speed switch 58, gear switch 59, and a vehicle speed sensor 60.

The vacuum switch 52 turns on when a vacuum $P_B$ in the intake manifold 26 is equal to or below a first predetermined vacuum level $P_1$ (150 mmHg for example). Similarly, the vacuum switch 53 turns on when the vacuum $P_B$ in the intake manifold 26 is equal to or above a second predetermined vacuum level $P_2$ (300 mmHg for example) which is equal to or greater than the first predetermined vacuum level $P_1$. The intake air temperature switch 54 turns on when the intake air temperature $T_A$ is equal to or below a first predetermined temperature $T_1$ (15° C. for example). The engine coolant temperature switch 55 turns on when the engine coolant temperature $T_W$ is equal to or below a second predetermined temperature $T_2$ (40° C. for example). The engine coolant temperature switch 56 turns on when the engine coolant temperature $T_W$ is equal to or above a third predetermined temperature $T_3$ (75° C. for example) which is higher than the second predetermined temperature $T_2$. The vehicle speed switch 57 turns on when the vehicle speed V is equal to or above a predetermined speed $V_1$ (15 Km/h for example). The rotational speed switch 58 turns on when the engine rotational speed $N_e$ is equal to or lower than a predetermined rotational speed $N_1$ (4000 r.p.m. for example). The gear switch 59 turns on when, in the case of a 5 speed transmission, any one of the third to fifth gears is engaged. Each of these switches 52 through 59 produces a high level output signal when it turns on. On the other hand, the vehicle speed sensor 60 produces a voltage signal whose level varies with the vehicle speed V.

Figure 2:
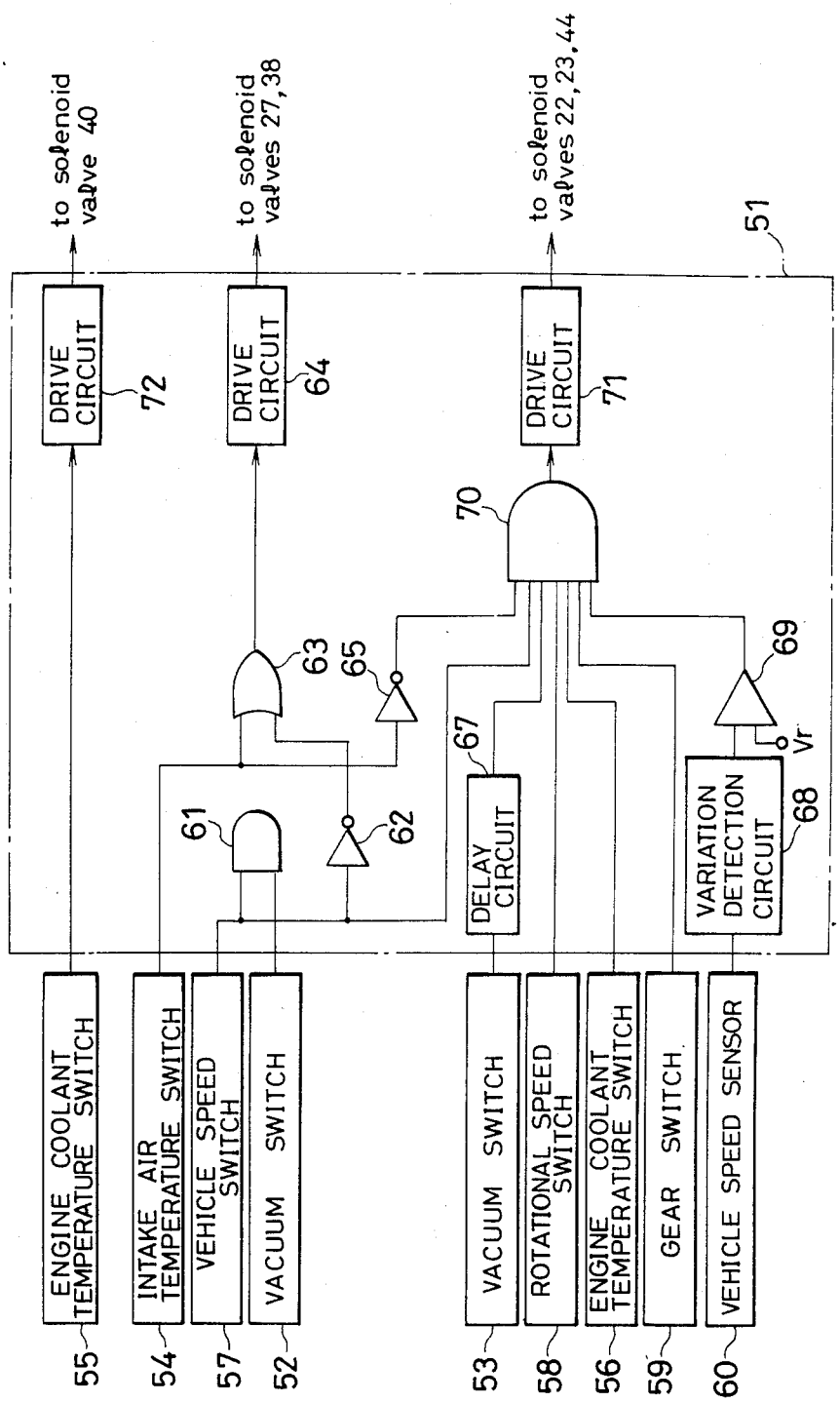
FIG. 2 is a block diagram showing the construction of the control circuit 51 of the system shown in FIG. 1.

As shown in FIG. 2, the control circuit 51 includes an AND circuit 61 which calculates a logical product between the vacuum switch 52 and the vehicle speed switch 57, an inverter 62 which receives the output signal of the vehicle speed switch 57, an OR circuit 63 which calculates a logical sum of the output signals of the intake air temperature switch 54, the AND circuit 61, and the inverter 62, and a drive circuit 64 connected to an output of the OR circuit 63. The solenoid valves 27 and 38 are driven by the drive circuit 64. The control circuit 51 also includes an inverter 65 connected to an output of the intake air temperature switch 54, a delay circuit 67 connected to the output of the vacuum switch 53, a variation detection circuit 68 connected to the vehicle speed sensor 60, a comparator 69 connected to the variation detection circuit 68, an AND circuit for calculating a logical product of the output signals of the engine coolant temperature switch 56, the vehicle speed switch 57, the rotational speed switch 58, the gear switch 59, the inverter 65, the delay circuit 67, and the comparator 69, and a drive circuit 71 connected to the AND circuit 70. When a high level input signal is applied for more than a predetermined time period (2 seconds for example), the delay circuit 67 changes its output signal level from a low level to a high level, and maintains the high level output signal until the application of the high level input signal stops. The operation of the variation detection circuit 68 is to sample the output signal level of the vehicle speed sensor 60 at predetermined sampling timings and to provide a differential voltage between a latest sampled voltage and a preceding sampled voltage. The comparator 69 produces the high level output signal when the output signal level of the variation detection circuit 68 is equal to or below a predetermined voltage Vr which corresponds to a predetermined speed of variation (0.5 Km/h/sec for example). The drive circuit 71 is adapted to drive the solenoid valves 22, 23, and 44. In addition, the output signal of the engine coolant temperature switch 55 is applied to a drive circuit 72 for driving a solenoid valve 40.

The operation of the thus constructed air/fuel ratio control system according to the present invention will be explained hereinafter.

The operation of the exhaust gas recirculation (EGR) part will be explained first.

Assuming that the solenoid valve 38 is activated while the solenoid valves 40 and 44 are not activated, the vacuum $P_c$ from the vacuum detection hole 8 is applied to the vacuum chamber 37a of the air valve 37 through the vacuum supply passage 39 and the solenoid valve 40 as a result of the operation of the engine 4. If the magnitude of the vacuum $P_c$ is greater than the resilient force of the valve spring 37d, the valve element 37e will be moved in the direction to open the air control valve 37. As a result of the opening of the air control valve 37, atmospheric air drawn at the atmospheric air inlet port 34 flows into the intake manifold through the controlled intake air passage 35. The magnitude of the vacuum $P_a$ in the vacuum chamber 36a and the vacuum $P_b$ in the valve chamber 37b through which the atmospheric air passes are determined in proportion to the aperture ratios of the orifices 45 and 46.

When the difference between the vacuum $P_v$ from the vacuum detection hole 9 which acts in the valve chamber 36b and the vacuum $P_a$ is greater than the resilient force of the valve spring 36d, the valve element 36e of the regulation valve moves in the direction to open the regulation valve 36. As a result of the opening of the regulation valve 36, the vacuum $P_c$ which passed the orifice 47 is diluted by the vacuum $P_v$ to form a vacuum $P_e$.

Subsequently, due to the drop of the vacuum $P_c$ in the vacuum supply passage 39, that is, the drop of the vacuum $P_e$, the opening degree of the air control valve 37 is gradually reduced to cause a decrease of the amount of air flowing through the controlled intake air passage 35. Due to the reduction of the amount of air, the vacuum $P_a$ in the vacuum chamber 36 drops to close the regulation valve 36. As a result, the magnitude of the vacuum $P_e$ will be increased again, and these sequential operations will be performed repeatedly. Since these repeating operations are performed at a very high speed, the ratio between the vacuum $P_v$ and the vacuum $P_e$ becomes equal to the ratio between the vacuum $P_a$ and the vacuum $P_b$.

Therefore, when the amount of main intake air of the engine 4 is relatively small, the opening degree of the regulation valve 36 becomes large because the vacuum $P_a$ is greater than the vacuum $P_v$, and the vacuum $P_e$ becomes small. The opening degree of the regulation valve 36 decreases as the amount of the main intake air increases because the magnitude of the vacuum $P_v$ increases. Therefore, the vacuum $P_e$ becomes large.

When the solenoid valve 40 is not activated, the vacuum $P_e$ acts in the vacuum chamber 33a as well as in the vacuum chamber 37a, to cause the opening of the air valve 37 and the EGR control valve 33. Therefore, the amount of the air flowing through the controlled intake air passage 35 becomes proportional to the amount of the exhaust gas flowing through the EGR passage 32 when the solenoid valve 40 is not activated. Since the amount of air flowing through the controlled intake air passage 35 is proportional to the amount of the main intake air of the engine 4, the amount of the EGR control becomes proportional to the amount of the main intake air. As a result, the vacuum $P_e$ becomes proportional to the amount of the main intake air, and the rate of the exhaust gas recirculation is always maintained at a predetermined value. The predetermined EGR rate is determined according to the ratio between the vacuum $P_v$ and the vacuum $P_e$, that is, the ratio between the areas of the orifices 45 and 46.

The operation of the control circuit 51 is as follows. When the vehicle speed is lower than the predetermined speed $V_1$, the vehicle speed switch 56 turns off. Therefore, a low level input signal is applied to the inverter 62, which in turn provides a high level output signal to the OR circuit 63. Therefore, the OR circuit 63 produces a high level output signal. When the intake air temperature is lower than the predetermined temperature $T_1$, the intake air temperature switch 54 turns on to provide a high level signal to the OR circuit 63 which in turn produces a high level output signal. When the vehicle speed is above the predetermined speed $V_1$ and the vacuum $P_B$ in the intake manifold 26 is smaller than the first predetermined pressure $P_1$, all of the input signal levels of the AND circuit 61 become high and the AND circuit 61 produces the high level signal which is in turn applied to the OR circuit 63. Thus, the OR circuit 63 produces the high level output signal.

When the OR circuit 63 produces the high level output signal in this way, the high level output signal is supplied to the drive circuit 64 as a driving signal. Thus, the solenoid valves 27 and 38 are activated by the drive circuit 64. During the period of activation of the solenoid valve 27, a portion of the vacuum supply passage 25 leading to the intake manifold is closed and a portion of the vacuum supply passage 25 leading to the power valve 24 is closed. Therefore, the atmospheric pressure acts in the vacuum chamber 24a of the power valve 24 to open the power valve 24. Under this condition, fuel from the float chamber 12 is supplied to the main nozzle 11 through the main jet as well as the power valve 24, and sucked out from the main nozzle 11. The fuel supply amount is increased in this way. On the other hand, the communication through the controlled intake air passage 35 is made by the activation of the solenoid valve 38. Accordingly, if the air valve 37 is opened, atmospheric air from the atmospheric air inlet port 34 flows through the controlled intake air passage without passing through the orifice 49 of the auxiliary passage 35a. The atmospheric air flows into the vacuum chamber 36a of the regulation valve 36 only through the orifice 45. In this case, the ratio between the vacuum $P_v$ and the vacuum $P_e$ is determined by the ratio of the areas of the orifices 45 and 46. The vacuum $P_a$ in the vacuum chamber 36a becomes smaller than that obtained when the atmospheric air flows through the orifice 49 with the controlled intake air passage 35 closed. Therefore, the degree of the dilution of the vacuum $P_c$ by the vacuum $P_v$ is reduced. Therefore, the vacuum $P_c$ becomes large and proportional to the amount of the main intake air of the engine 4. Thus, the opening degree of the EGR control valve 33 is increased to raise the EGR ratio. Thus, an EGR control largely proportional to the load is performed.

The above described operation will be summarized as follows. The power valve 24 is operated when the vehicle speed is lower than a predetermined speed $V_1$, when the intake air temperature is below the first predetermined temperature $T_1$, or when the vacuum $P_b$ in the intake manifold 26 is smaller than the first predetermined pressure $P_1$ while the vehicle speed is higher than a predetermined speed $V_1$. Therefore, the fuel supply amount is increased to enrich the air/fuel ratio to a value of 14.7:1 for example. At the same time, an EGR of large quantity, proportional to the load is performed.

When the vehicle speed is above the predetermined speed $V_1$ while the vacuum $P_B$ in the intake manifold 26 is equal to or above the first predetermined pressure $P_1$, and the intake air temperature is equal to or above the first predetermined value $T_1$, each of the levels of the input signals of the OR circuit 63 becomes low, and the OR circuit 63 produces a low level output signal. Under this state, the drive circuit 64 stops the activation of the solenoid valves 27 and 38. During a period of inactivation of the solenoid valve 27, the communication through the vacuum supply passage 25 is made and the vacuum $P_B$ in the intake manifold 26 is supplied to the vacuum chamber 24a of the power valve 24 through the vacuum supply passage 25. Therefore, the power valve 24 is closed and the fuel from the float chamber 12 is supplied to the main nozzle only through the main jet 14. In this way a normal fuel supply in which the air/fuel ratio is made leaner, to a base air/fuel ratio (16.5:1 for example) of the carburetor, is performed. When the operation of the solenoid valve 38 is stopped, the controlled intake air passage 35 is closed by the solenoid valve 38. Therefore, atmospheric air passes through the auxiliary passage 35a and an EGR of small amount proportional to the load is performed by the orifice 49.

When the vacuum $P_B$ in the intake manifold 26 becomes equal to or above the second predetermined value $P_2$ while the vehicle speed is equal to or above the predetermined speed $V_1$, the vacuum switch 53 turns on to provide the high level output signal to the delay circuit 67. The delay circuit 67 which is provided for giving a hysteresis characteristic to the output signal of the vacuum switch 53 provides a high level output signal to the AND circuit 70 when a high level input signal is applied for more than a predetermined time period. If, under this condition, the intake air temperature $T_A$ becomes higher than the predetermined temperature $T_1$, the intake air temperature switch 54 turns off to provide a low level output signal to the inverter 65. Therefore, a high level signal is applied to the AND circuit 70. If the engine coolant temperature is equal to or above the third predetermined temperature $T_3$, a high level output signal of the engine coolant temperature switch 56 is also supplied to the AND circuit 70. If the vehicle is operating under a normal condition, the comparator 69 produces a high level output signal to be supplied to the AND circuit 70 and the gear switch 59 provides a high level output signal to the AND circuit 70 if any one of the third gear through fifth gear of the transmission is engaged. Thus, when the levels of all of the input signals of the AND circuit 70 become high, the AND circuit 70 produces a high level output signal. As a result, the drive circuit 71 activates the solenoid valves 22, 23, and 44. By the activation of the solenoid valves 22 and 23, the communications through the auxiliary air bleeds 16 and 21 are made respectively and atmospheric air flows into the auxiliary air bleeds 16 and 21 as well as the main air bleed 15 and the slow air bleed 20. Thus, the ratio of air is increased both in the main fuel supply system and in the slow fuel supply system, to make the air/fuel ratio leaner. By the operation of the solenoid valve 44, a portion of the vacuum supply passage 43 leading to the vacuum detection hole 9 is closed and at the same time a portion of the vacuum supply passage 43 leading to the vacuum chamber 36b is opened to the atmosphere through the atmospheric pressure inlet port 43. As a result, the application of the vacuum $P_v$ from the vacuum detection hole 9 to the valve chamber 36b is stopped and the atmospheric pressure is supplied to the valve chamber 36b through the vacuum supply passage 43 to open the regulation valve 36. Therefore the vacuum $P_c$ is diluted by the atmospheric air to reduce the magnitude of the vacuum $P_e$, and the latter is maintained at substantially constant value. Accordingly, the opening degree of the EGR valve 33 becomes very small and the amount of the EGR becomes very small.

When the intake air temperature is lower than the predetermined temperature $T_1$ or when the engine coolant temperature is lower than the predetermined temperature $T_3$, the drive of the solenoid valves 22, 23, and 44 is stopped since the combustion condition of the engine tends to be unstable under such states. The operation of the solenoid valves 22, 23, and 44 is also stopped when the vacuum $P_B$ in the intake manifold 26 is smaller than the predetermined value $P_2$ or when the engine rotational speed is equal to or above the predetermined rotational speed $N_1$ for preventing the generation of over lean mixture because this condition indicates a high load operation of the engine. Also, if the speed of variation of the engine speed is equal to or above the predetermined speed of variation, the driving of the solenoid valves 22, 23 and 44 is stopped to prevent the generation of an over-lean mixture because this state indicates the acceleration of the vehicle under a transitional state. In addition, when the vehicle speed is lower than the predetermined speed $V_1$ or when either one of the first gear and the second gear is engaged, the operation of the solenoid valves 22, 23, and 44 are stopped to maintain the air/fuel ratio to a base air/fuel ratio in cosideration of the transitional state from a low speed running state to a cruising state.

When the engine coolant temperature is lower than the second predetermined temperature $T_2$, the engine coolant temperature switch 55 turns on to provide a high level output signal to the drive circuit 72, which in turn activates the solenoid valve 40. By the operation of the solenoid valve 40, the vacuum supply passage 39 is closed at its portion leading to the vacuum detection hole 8, and at the same time the vacuum supply passage 39 is opened to atmosphere at its portion leading to the vacuum chamber 37a and the vacuum supply passage 42. As a result, the supply of the vacuum $P_c$ from the vacuum detection hole 8 is stopped and the atmospheric pressure is applied to the vacuum chamber of the EGR valve 33 through the vacuum supply passages 39 and 42. Therefore, the EGR valve 3 is closed to stop the flow of the exhaust gas through the EGR passage 32.

Above, the operation of an embodiment of the air/fuel ratio control system according to the present invention, which controls the EGR rate as well as the air/fuel ratio, has been explained. It should be noted, however, that the system can be operated in a manner such that only the air/fuel ratio control is effected. In that case, the air/fuel ratio control operation is performed in the same manner as the operational sequence described above.

Thus, according to the present invention, the air/fuel ratio is controlled to the predetermined reference value when the speed of variation of the detected value of an operating parameter exceeds a predetermined level even though the magnitude of the engine load is within a range in which the air/fuel ratio is to be controlled leaner than the reference value. Further, if the engine is equipped with the EGR system and the engine load is within a range in which the EGR rate is to be made smaller than a predetermined EGR rate, the EGR rate is also controlled to the predetermined EGR rate along with the air/fuel ratio control when the speed of variation of the detected value of the engine parameter exceeds the predetermined level.

In this way, a sufficient engine output power is maintained when a rapid change of an operating parameter occurs even though the engine load is in a range for providing a leaner mixture. Thus the driveability of the vehicle is by far improved.

What is claimed is:

1. In an air/fuel ratio control system for an internal combustion engine, including load detection means for detecting a load of said engine using a plurality of operating parameters, and air/fuel ratio control means for controlling an air/fuel ratio of mixture to be supplied to the engine toward a reference value as a target when an engine load detected by said load detection means is within a first load range, and for controlling the air/fuel ratio toward a value larger than said reference value when said engine load detected by said load detection means is within a second load range which is on lighter side of said first load range, the improvement wherein a varying speed detection means is provided for detecting a speed of variation of at least one of said operating parameters, and said air/fuel ratio control means is operated to control the air/fuel ratio toward the reference value while the engine load is within the second load range if the speed of variation of at least one of the operating parameters detected by the varying speed detection means exceeds a predetermined value.

2. An air/fuel ratio control system as set forth in claim 1, wherein said one of said operating parameters is a vehicle speed detected at a vehicle speed sensor.

3. In an air/fuel ratio and EGR control system for an internal combustion engine, including load detection means for detecting a load of said engine using a plurality of operating parameters, and air/fuel ratio and EGR control means for controlling an air/fuel ratio of mixture to be supplied to the engine towards a reference value as a target and controlling an EGR rate to a predetermined EGR rate when an engine load detected by said load detection means is within a first load range, and for controlling the air/fuel ratio toward a value larger than said reference value and controlling the EGR rate to an EGR rate smaller than said predetermined EGR rate when said engine load detected by said load detection means is within a second load range which is on ligher side of said first load range, the improvement wherein a varying speed detection means is provided for detecting a speed of variation of at least one of said operating parameters, and said air/fuel ratio and EGR control means is operated to control the air/fuel ratio toward the reference value and to control the EGR rate to said predetermined EGR rate while the engine load is within the second load range if the speed of variation of at least one of the operating parameters detected by the varying speed detection means exceeds a predetermined value.

4. An air/fuel ratio and EGR control system as set forth in claim 3, wherein said one of said operating parameters is a vehicle speed detected at a vehicle speed switch.

* * * * *